United States Patent [19]

Carr et al.

[11] 3,812,652

[45] May 28, 1974

[54] PROCESS FOR REGENERATING METAL OXIDES USED IN THE REMOVAL OF ARSENIC FROM GASEOUS STREAMS

[75] Inventors: Norman L. Carr, The Hague, Netherlands; Franklin E. Massoth, Middlesex Twp., City of Butler, Pa.; Donald L. Stahlfeld, Glenshaw, Pa.; John E. Young, Jr., Middlesex Twp., City of Butler, Pa.

[73] Assignee: Gulf Research & Development Company, Pittsburgh, Pa.

[22] Filed: Apr. 27, 1972

[21] Appl. No.: 247,982

[52] U.S. Cl. .......................................... 55/68, 55/74
[51] Int. Cl. ............................................. B01d 53/04
[58] Field of Search ............ 55/48, 73, 68, 74, 179, 55/387; 196/44, 46; 208/88, 91; 423/210, 229, 234, 240

[56] References Cited

UNITED STATES PATENTS

| 2,781,297 | 2/1957 | Appell ................................. 208/88 |
| 3,501,897 | 3/1970 | Van Helden et al .................... 55/73 |

*Primary Examiner*—Charles N. Hart

[57] ABSTRACT

A process for regenerating a metal oxide sorbent used in the removal of arsenic from a gaseous hydrocarbon stream. The sorbent, usually copper oxide or lead oxide, is contacted with a stream of free molecular oxygen at low temperatures suitably in the range of 150° to 700°F. for a period of from about 2 to about 40 hours.

10 Claims, No Drawings

3,812,652

PROCESS FOR REGENERATING METAL OXIDES USED IN THE REMOVAL OF ARSENIC FROM GASEOUS STREAMS

This invention relates to the regeneration of spent metallic oxides and more particularly to a process for regenerating oxides of copper or lead used in the removal of arsenic from gaseous hydrocarbon streams.

BACKGROUND OF THE INVENTION

It has been found that the presence of arsenic in light hydrocarbon gaseous streams produced by the catalytic cracking of petroleum has a deleterious effect upon the noble metal containing catalysts often employed in the subsequent processing of those streams. It thus becomes desirable to reduce the arsenic content of those gaseous feedstreams to a harmless level before subjecting them to further processing. Oxides of copper or lead, well dispersed upon a suitable support, are useful for this purpose as is well dispersed copper metal. Although it is believed that a major portion of the arsenic contained in the gases is present as arsine ($AsH_3$), the term "arsenic" as used herein is intended to include arsenic in any combined gaseous form.

For the purposes of this application, the metal oxide treated in accordance with the process of the invention will be termed a "sorbent," although that term is not intended to suggest that the arsenic removal is accomplished by simple physical adsorption. While not wishing to be bound by any particular theory, it is believed that some chemical reaction is involved between the arsenic and the sorbent. At a minimum, it is believed that the removal of arsenic is accomplished by chemisorption; that is, the arsenic forms bonds with the surface atoms of the sorbent that are of comparable strength with ordinary chemical bonds and stronger than the bonds formed in physical adsorption.

As the arsenic-containing gases are contacted by the dispersed sorbent, an acceptable loading of arsenic is withstood by the sorbent before breakthrough. In this context, the term "breakthrough" means the passage of arsenic beyond or downstream of the substance intended to remove it, and is usually expressed as a percentage of the arsenic not removed in relation to the arsenic content of the charge stock.

The operation of the arsenic removal unit is such that it begins at relatively low temperatures until breakthrough of arsenic is noted in the product by suitable analytical techniques. The operating temperature of the unit is then increased and an increased removal of arsenic is achieved. When breakthrough occurs at the maximum allowable temperature of operation, the sorbent is spent and must be replaced or regenerated. Replacement involves the cost of new sorbent material and, therefore, it is preferable from the standpoint of economics to regenerate the sorbent in place.

SUMMARY OF THE INVENTION

It has been discovered that oxides of copper and lead laden with arsenic can be inexpensively regenerated to permit their re-use in a stream of gaseous hydrocarbons to again reduce the arsenic content of that stream. Surprisingly, the regeneration of the material to an active condition is achieved without volatilizing any significant arsenic from said material during regeneration. Pollution problems associated with expelling volatile arsenic compounds into the air are thereby minimized or avoided.

The present invention provides a process for regenerating or reactivating a metal oxide sorbent used in the removal of arsenic from a gaseous stream such as a gaseous hydrocarbon stream. The process comprises contacting the metal oxide sorbent with a gas comprising free molecular oxygen at a temperature of at least 150°F. but less than that temperature wherein substantial amounts of arsenic would be vaporized. Preferably the regeneration occurs at a temperature from 150°F. to about 700°F., and more preferably from 250° to 500°F. The sorbent is typically maintained in contact with the gas comprising free molecular oxygen for a period of from about 2 to 40 hours, usually from 10 to 30 hours. The preferred metal oxide sorbents are copper oxide and lead oxide.

DETAILED DESCRIPTION OF THE INVENTION

The charge stock from which arsenic is removed by contact with a copper oxide or lead oxide sorbent may be a gaseous hydrocarbon feedstream having one to five carbon atoms per molecule and which feedstream contains arsenic as an impurity, typically in an amount from about 20 parts per billion (ppb) to about 20 parts per million (ppm) or more. In this application the term "ppb" means "parts per billion" and "ppm" means "parts per million," and such parts are parts by volume unless otherwise indicated. Particularly preferred for treatment are those light hydrocarbon gases obtained by the catalytic cracking of heavier petroleum hydrocarbons such as gas oils in producing gasoline. The cracking operation normally takes place in a fluid catalytic cracking (FCC) unit. These light gases from the FCC unit have been found to contain small concentrations of arsenic even though arsine, for example, is known to decompose at about 450°F. and the temperatures in the FCC unit are known to reach over 900°F. There is probably insufficient contact time in an FCC unit to decompose the arsine, or perhaps the arsine decomposes and reforms on cooling.

It is further provided that the hydrocarbons in the feedstream have from one to five carbon atoms per molecule with minor amounts of about two percent or less of higher carbon atom molecules such as $C_6$. Preferably, the hydrocarbons in the feedstream have from one to three carbon atoms with minor amounts of about 10 percent or less of hydrocarbons having from four to six carbon atoms. The feedstream normally includes olefins and water vapor. Preferably, the charge stock is free of sulfur compounds such as $H_2S$ since sulfur compounds appear to interfere with the removal of arsine from gaseous hydrocarbon charge stocks. That is, the process of the invention will operate in the presence of sulfur compounds but the loading of the supported sorbent before breakthrough will be seriously impaired. When copper oxide is employed, it is preferred to have the charge stock free or substantially free of acetylenes as any acetylenes present may react with the copper to form copper acetylides which in their dry state are explosive.

The sorbent employed in the arsenic removal process is converted to a high surface area form by dispersion onto a suitable high surface area support. The manner of dispersing the sorbent on the supports is not critical and may be accomplished by means well known in the art. One method involves the deposition of copper or lead from an aqueous solution of a suitable salt of the metal such as cupric nitrate or lead nitrate followed by conversion of the salt to oxide by calcining in the presence of air. The metal salt which is employed must be one which will decompose to the desired oxide form or which can be oxidized to the desired oxide form under conditions which will not impair the desired surface area characteristics of the support. Other methods of depositing copper oxide, for example, are described in U. S. Pat. Nos. 2,511,288 and 2,513,508, both to Morrell et al.

The sorbent is normally used in the oxidized form but, if desired, conversion of dispersed copper oxide sorbent to copper may be accomplished by heating the supported sorbent to at least 700°F. in the presence of flowing hydrogen, as is well known in the art. The use of lower temperatures and/or short contact times with hydrogen would result in the production of mixtures of copper oxide and copper. Copper in the metallic form can also be employed, but is not preferred since after regeneration, the copper is in the oxide form and would then have to be reduced to the metallic state. When copper or copper oxide is employed, the dispersed supported copper or copper oxide should have an oxygen uptake value (to be defined later) of at least five and more preferably of at least 40.

The expression "oxygen uptake value" is a measure of the degree of dispersion of the sorbent on its support, expressed as milliliters of oxygen per gram of copper. The procedures for determining this value for a particular sorbent are detailed hereinbelow.

The amount of lead dispersed on the support is suitably from 5 to 50 weight percent and preferably from 10 to 30 weight percent of the total sorbent plus support. The lead is believed to be present as an oxide of lead.

Suitable high surface area supports are those well known in the art as catalyst supports. Examples of suitable supporting materials are the usual porous naturally occurring or synthetically prepared high surface area, i.e., over about 50 $m^2/g$, refractory metal oxides well known in the art as catalyst supports, e.g., alumina, silica, boria, thoria, magnesia or mixtures thereof. Preferably the supporting material is one of the partially dehydrated forms of alumina. More preferably, the alumina is one having a surface area in excess of 50 $m^2/g$, preferably a surface area of 150 to 350 $m^2/g$. Suitable forms of the higher surface area aluminas and their methods of preparation are described in the Kirk-Othmer Encyclopedia of Chemical Technology, Second Edition, Volume 2, pages 41 et seq. Other suitable supports include clays, zeolites and crystalline silica aluminas.

The concentration of arsenic in the hydrocarbon gases to be treated is reduced from a concentration in excess of 20 ppb to a concentration of less than 20 ppb. The concentration of arsenic in an FCC absorber gas may be on the order of 50 to 750 ppb but can be as high as 20 ppm or more. Preferably the arsenic content of the gases is lowered to less than 10 ppb and more preferably to less than 2 ppb in an arsenic removal unit.

The temperatures to be employed in an arsenic removal unit can suitably be from 50° to 400°F., are usually from 80° to 250°F., and are preferably from 100° to 200°F. Temperatures below 50°F. are undesirable because of increased cost and the decreased activity of the sorbent at those levels. Temperatures above the stated range are undesirable due to the increased expense of operating the process. Primarily excessive temperatures are undesirable for the further reason that when feedstreams contain both olefins and hydrogen, as do FCC absorber gases, hydrogenation of the olefins is promoted by high temperature levels. At 250°F., however, it has been found that less than 1 percent hydrogenation of propylene is experienced in the treatment of a typical FCC absorber gas to remove arsenic in accordance with the present invention using copper. Lead does not promote hydrogenation.

The pressure to be employed in an arsenic removal unit is suitably atmospheric pressure or below to 1,000 psig or more. FCC units typically operate to produce product gases, as noted above, at pressures from about 250 to 350 psig. The process of the present invention operates well at atmospheric pressure, but since it is expensive to depressure the FCC absorber gases and repressure the final products for transport through pipelines, it is desirable to operate the arsenic removal process at increased pressures of, say, 250 to 350 psig. A limitation on the maximum operating pressure is, however, the effect of pressure on promoting undesirable side reactions such as the polymerization and hydrogenation of any olefins which may be present in the feedstream when a copper or copper oxide sorbent is employed. The gaseous volume hourly space velocity (GVHSV) at standard conditions of temperature and pressure can suitably be from 1,000 to 36,000 v/v/hr and is usually from 2,000 to 10,000 v/v/hr.

Regeneration of the sorbent comprises passing a gas containing free molecular oxygen, such as air, over the spent sorbent for an extended period of time of at least about 2 hours, at a temperature of at least 150°F. but less than that temperature wherein substantial amounts of arsenic would be vaporized. Usually a period of time of about 2 to 40 hours is sufficient, although it is to be understood that much longer times of 100 hours or more can be employed, if desired. Preferably the regeneration time is about 10 to about 30 hours. By "substantial" amounts of arsenic is meant more than 10 percent by weight of the arsenic on the sorbent. Preferably the regeneration occurs at a temperature in the range of 150° to 700°F., more preferably 250° to 550°F. It is a surprising feature of the process of this invention that the metal oxide sorbent which is deactivated by the deposition of arsenic from a gaseous hydrocarbon stream can be reactivated without the removal during regeneration of substantial amounts of arsenic. In fact, it appears that even increased loadings of arsenic can be tolerated before breakthrough after regeneration, especially the higher temperature regenerations. Maximum regeneration temperatures will ordinarily be governed by the undesired vaporization of arsenic as noted above and other factors such as equipment limitations, and the physical stability of the supporting material upon which the sorbent is dispersed. Any gas containing free molecular oxygen can be employed. Usually the free molecular oxygen content is from about 5 to 50 percent or more, the amount of oxygen being regulated so as not to exceed the allowable temperatures in the bed. Air, alone, or diluted with steam, is the preferred regeneration gas. If desired, the bed of sorbent to be regenerated can suitably be purged with nitrogen or steam to remove any gaseous hydrocarbons remaining from the processing cycle. This purge period may also be used to preheat the bed to the desired regeneration temperature by utilizing properly preheated purge gases. Steam or nitrogen can continue to be used as a diluent during regeneration to control the thermal front as it moves through the bed.

In general, the time of regeneration is a function of mass flow rate of free molecular oxygen available in the regeneration medium, and the length of the sorbent bed. These factors may be varied by those skilled in the art to optimize and control the regeneration procedures.

Several tests were run under varying conditions to illustrate the present invention. The results of these tests are presented in Table I below. The procedures employed for all tests were identical and were as follows: Gaseous charge stocks were prepared by mixing a sufficient amount of a blend of 2,000 ppm $AsH_3$ in nitrogen (supplied by Matheson Gas Co.) with one of the following diluent gases to obtain a charge stock having the designated ppm of $AsH_3$ as shown in Tables I–IV below.

DILUENT GAS NO. 1

A pure hydrocarbon blend having the following approximate analysis:

| COMPONENT | VOL. % |
|---|---|
| Propylene | 15 |
| Ethane | 12 |
| Ethylene | 10 |
| Methane | 30 |
| Hydrogen | 15 |
| Nitrogen | 18 |
| | Total: 100 |

DILUENT GAS NO. 2

| COMPONENT | VOL. % |
|---|---|
| Propylene | 50 |
| Nitrogen | 50 |

DILUENT GAS NO 3

A commercial FCC absorber gas of the following analysis:

| COMPONENT | TYPICAL VOL. % | RANGE VOL. % |
|---|---|---|
| Carbon monoxide | 1.6 | 0.2–3.4 |
| Hydrogen | 7.9 | 9–12 |
| Nitrogen | 9.8 | 6–10 |
| Methane | 30.0 | 27–33 |
| Ethylene | 9.8 | 9–11 |
| Ethane | 12.4 | 10–13.0 |
| Propylene | 17.2 | 15–18.0 |
| Propane | 7.6 | 7–15 |
| Butenes | 0.4 | 0–1.0 |
| Isobutane | 1.3 | 1–2.0 |
| n-Butane | 0.1 | 0–1.0 |
| $C_5$ | 1.7 | 0–3 |
| $C_6$ | 0.2 | 0–1 |
| | Total 100.0 | |
| Arsenic | 450 ppb | 50–750 ppb |
| Hydrogen Sulfide | 1 ppm(wt) | 0–2 ppm |
| Carbonyl Sulfide | 3.4 ppm(wt) | 0–5 ppm |

The diluent gases were passed through a water bubbler to saturate them with water vapor at ambient temperature before the $AsH_3$ was added.

The reactor containing the supported sorbent consisted of a ⅜ inch I.D. stainless steel cylinder, with a ¼ inch O.D. thermowell extending along its axis. The reactor was suitably heated. The temperature at the center of the supported sorbent material was measured by means of an iron-constantan thermocouple inserted into the thermowell. The test gas was introduced at the bottom of the reactor, passing through an approximately 6-inch-long bed of quartz chips which served to preheat the gas stream.

The sorbents were dispersed on gamma-alumina in accordance with the procedures generally set forth above. The bed of supported sorbent within the reactor was approximately 4 to 8 inches in length and consisted of 5–10 cc. of material sized to 20–40 mesh. Where copper oxide was employed as the sorbent, the weight percent of copper compared with the total weight of support material and sorbent was 13 percent. Where lead oxide was the sorbent, the weight percent of lead compared with the total weight of support material and sorbent was 20 percent.

The arsine not removed by the passage through the bed of supported sorbent was scrubbed from the effluent gas stream by a pyridine solution containing 0.50 g. silver diethyldithiocarbamate (Fisher Certified Reagent) per 100 ml. pyridine. This silver salt combines with the arsine to form a highly colored complex, permitting colorimetric monitoring of the total arsine breakthrough accumulation. Small samples were periodically drawn from the arsine scrubber and the optical transmittance at 540 mm. wavelength was measured with a Bausch and Lomb Spectronic 70 spectrophotometer. This optical transmittance was then plotted as a function of time. The numerical derivative of this curve was calculated to determine the rate of arsine breakthrough. The percent breakthrough figures given in the Tables below represent the percentage of the arsenic not removed in relation to the arsenic content of the charge stock.

The procedure for carrying out the in-place regenerations reported in the Tables below was as follows:

1. the arsine and hydrocarbon gases were flushed from the reactor with nitrogen;
2. air was introduced to the reactor at a space velocity of approximately 3,000 v/v/hr at a temperature of 80° to 150°F.;
3. the temperature was increased by external means over a time period of about one hour to the desired regeneration temperature and held at this temperature for the required regeneration time; and
4. the reactor was cooled with a stream of air and then flushed with nitrogen in preparation for the next run.

The results of the first series of runs are shown in Table I below.

TABLE I

| Example | Sorbent | Support | Temp., °F. | Pressure, p.s.i.g. | GVHSV | Conc. $AsH_3$ in charge stock (p.p.m.) | Diluent gas [1] | Cumulative as loading (weight percent) | Comment |
|---|---|---|---|---|---|---|---|---|---|
| 1 | CuO | γ-$Al_2O_3$ | 80 | 15 | 3,000 | 3 | No. 2 | 0.3 | No breakthrough. |
| 2 | CuO | γ-$Al_2O_3$ | 80 | 15 | 3,000 | 40 | No. 3 | 4.0 | 2% breakthrough. |
| 3 | CuO | γ-$Al_2O_3$ | 150 | 15 | 3,000 | 40 | No. 3 | 4.5 | No breakthrough. |
| 4 | CuO | γ-$Al_2O_3$ | 150 | 15 | 3,000 | 200 | No. 3 | 5.0 | Do. |
| 5 | CuO | γ-$Al_2O_3$ | 150 | 15 | 3,000 | 200 | No. 1 | 8.1 | 15% breakthrough. |
| 6 | CuO | γ-$Al_2O_3$ | 150 | 15 | 3,000 | 40 | No. 1 | 8.9 | 33% breakthrough. |
| REGENERATED SUPPORTED CuO FROM EXAMPLE 6, 3½ HOURS IN AIR AT 500° F. | | | | | | | | | |
| 7 | CuO | γ-$Al_2O_3$ | 150 | 15 | 3,000 | 40 | No. 1 | 10.0 | No breakthrough. |

[1] Designated by number from description above.

Referring to Table I, it can be seen that increased arsenic loading is achieved after regeneration of the sorbent in air at 500°F.

A second series of runs was made and are summarized in Table II below.

hours, then treated in flowing helium (40 mls/min) for 1 hour at the same temperature. Oxygen uptake values were measured after the samples were cooled to 25°C. by the pulse adsorption method fully described in the article "Separate Determination of the Surface of Complex Catalysts by Chromatographic Methods, 1. Nickel on Carriers" by N. E. Buyanova et al., appearing first in Kinetika i Kataliz, Vol. 8, No. 4, pp. 868–877, July–August, 1967 and translated into English and appearing in Kinetics and Catalysis, 8, 787, (1967). The oxygen uptake values for the sorbents used in Tables I, II and III above, expressed in terms of oxygen uptake at 77°F. in units of ml. S.T.P. of oxygen per gram of copper on the sample, was 54.

TABLE II

| Example | Sorbent | Support | Temp., °F. | Pressure, p.s.i.g. | GVHSV | Conc. AsH$_3$ in charge stock (p.p.m.) | Diluent gas [3] | Arsenic loading (weight percent) | |
|---|---|---|---|---|---|---|---|---|---|
| | | | | | | | | 10% breakthrough | 20% breakthrough |
| 8 | CuO | γ-Al$_2$O$_3$ | 150 | 15 | 9,000 | 50 | No. 3 | 6.1 | 6.6 |
| REGENERATED SUPPORTED CuO FROM EXAMPLE 8, 1½ HOURS IN AIR AT 450° F. PLUS 16 HOURS IN AIR AT 350° F. | | | | | | | | | |
| 9 | CuO | γ-Al$_2$O$_3$ | 150 | 15 | 9,000 | 50 | No. 3 | [1] 3.6 | [1] 3.9 |
| REGENERATED SUPPORTED CuO FROM EXAMPLE 9, 16 HOURS IN AIR AT 150° F. | | | | | | | | | |
| 10 | CuO | γ-Al$_2$O$_3$ | 150 | 15 | 9,000 | 50 | No. 3 | [2] 1.0 | |

[1] Additional loading of arsenic.
[2] Additional loading of arsenic at 0% breakthrough—test terminated.
[3] Designated by number from description above.

Referring to Table II, it can be seen that varying regeneration conditions can successfully be employed.

A third series of runs was made and are summarized in Table III below.

TABLE III

| Example | Sorbent | Support | Temp., °F. | Pressure, p.s.i.g. | GVHSV | Conc. AsH$_3$ in charge stock (p.p.m.) | Diluent gas [3] | Arsenic loading (weight percent) | |
|---|---|---|---|---|---|---|---|---|---|
| | | | | | | | | 10% breakthrough | 20% breakthrough |
| 11 | CuO | γ-Al$_2$O$_3$ | 200 | 15 | 9,000 | 50 | No. 3 [1] | 1.8 | 2.2 |
| REGENERATED SUPPORTED CuO FROM EXAMPLE 11, 16 HOURS IN AIR AT 250° F. | | | | | | | | | |
| 12 | CuO | γ-Al$_2$O$_3$ | 200 | 15 | 9,000 | 50 | No. 3 | [2] 2.6 | [2] 3.3 |
| REGENERATED SUPPORTED CuO FROM EXAMPLE 12, 16 HOURS IN AIR AT 350° F. | | | | | | | | | |
| 13 | CuO | γ-Al$_2$O$_3$ | 200 | 15 | 9,000 | 50 | No. 3 | [2] 3.7 | [2] 5.2 |
| REGENERATED SUPPORTED CuO FROM EXAMPLE 13, 16 HOURS IN AIR AT 700° F. | | | | | | | | | |
| 14 | CuO | γ-Al$_2$O$_3$ | 200 | 15 | 9,000 | 50 | No. 3 | [2] 5.2 | [2] 6.4 |

[1] Charge contained 200 p.p.m. H$_2$S.
[2] Additional loading of arsenic.
[3] Designated by number from description above.

Referring to Table III, the copper sorbent can also be successfully regenerated after contact with a charge containing H$_2$S.

OXYGEN UPTAKE

The materials (sorbents plus support) used in the runs reported in the above examples were tested for oxygen uptake values by the following procedure: Approximately 2.5 g. of each supported sorbent sample was heated 50°C./min to 400°C. in flowing hydrogen (40 mls/min). Each was held at this temperature for 2

The copper oxide-gamma-alumina materials used in Table I were prepared by the incipient wetness technique (minimum excess solution) using an aqueous copper nitrate solution. The incipient wetness absorptivity of the alumina was 0.8,130 ml/g of alumina. The wet material was dried at 250°F. and calcined at 1,000°F. for 15 hours. The compacted density was 0.730 g/cc and it had a nitrogen B.E.T. surface area of 180.6 m²/g and a nitrogen pore volume of 0.491. The final composition was about 13 weight percent copper and 87 weight percent Al₂O₃. The alumina used in this preparation had an initial nitrogen B.E.T. surface area of 282 m²/g and a nitrogen pore volume of 0.63 cc/g.

A fourth series of runs was made using a lead oxide sorbent and these runs are summarized in Table IV below.

The lead oxide sorbent used in Table IV below was typically prepared as follows: An aqueous solution of lead nitrate was prepared by adding 831.21 g. of Pb(NO₃)₂ (Mallinckrodt Analytical Reagent Grade) to distilled water to give a final volume of 1,670 ml. The weight of this solution was 2,322 g. and its specific gravity was 1.3904 g/cc. It contained the equivalent of 22.55% Pb.

A one-step incipient impregnation of the alumina was carried out by adding, with stirring, the Pb(NO₃)₂ solution to 2,055 g. of 1/16 inch extrudates of a suitable alumina which had previously been heated to 1,000°F. over a period of 6 hours and held at 1,000°F. for 10 hours. The incipient wetness absorptivity of the alumina was 0.8127 ml/g of alumina. The wet material was dried with occasional stirring for 12 hours at 250°F. The dry material was then calcined by raising the temperature to 1,000°F. over a period of 6 hours and holding at 1,000°F. for 9 hours. The final calcined composition analyzed 20 weight percent lead calculated as the metal. The compacted density was 0.804 g/cc and it had a nitrogen B.E.T. surface area of 160 m²/g and a nitrogen pore volume of 0.471.

The final sorbent was off-white in appearance. X-ray analysis of the sorbent showed the presence of some crystalline lead sulfate, which is white. There is a small amount of sulfate associated with the alimina base (1.08 percent sulfur), and this probably accounts for the presence of the lead sulfate. A similar preparation using a very low sulfur base (0.08 percent) showed the presence by X-ray diffraction analysis of the complex 4PbO·PbSO₄ which is also white. The lead nitrate from which the sorbent was prepared is known to decompose at conditions far less severe than the calcination conditions. Thus, while it is not certain, due to the complex chemistry of lead oxides, it is believed the lead is primarily present as PbO or some combination of PbO with lead sulfate due to the light color of the finished sorbent. Other forms of lead oxide such as PbO₂, Pb₂O₃ and Pb₂O are highly colored.

TABLE IV

| Example | Sorbent | Support | Temp., °F. | Pressure, p.s.i.g. | GVHSV | Conc. AsH₃ in charge stock (p.p.m.) | Diluent gas[2] | Arsenic loading (weight percent) 10% break-through | 20% break-through |
|---|---|---|---|---|---|---|---|---|---|
| 15 | Lead oxide | γ-Al₂O₃ | 150 | 15 | 9,000 | 50 | No. 3 | 0.46 | 0.75 |
| REGENERATED SUPPORTED PbO₂ FROM EXAMPLE 15, 16 HOURS IN AIR AT 350° F. | | | | | | | | | |
| 16 | Lead oxide | γ-Al₂O₃ | 150 | 15 | 9,000 | 50 | No. 3 | [1] 0.21 | [1] 0.51 |
| REGENERATED SUPPORTED PbO₂ FROM EXAMPLE 16, 16 HOURS IN AIR AT 550° F. | | | | | | | | | |
| 17 | Lead oxide | γ-Al₂O₃ | 150 | 15 | 9,000 | 50 | No. 3 | [1] 0.70 | [1] 0.94 |

[1] Additional loading of arsenic.
[2] Designated by number from description above.

Referring to Table IV, it can be seen that a lead oxide sorbent can be successfully regenerated.

Tests were conducted in a pilot unit in a commercial plant including regeneration of a supported copper oxide sorbent, wherein arsenic was removed from slipstreams of several light hydrocarbon absorber gases from an FCC unit. The regeneration media consisted of either air and steam or air and nitrogen followed by straight air.

EXAMPLE 18

In the run for this Example, an FCC absorber gas (having an analysis approximating that for Diluent Gas No. 3 above) was treated by passage through a bed of a copper oxide on alumina sorbent similar to that used in Example 1 above. The processing conditions increased in severity as the run continued to ensure a low level of arsenic in the outlet gases. The reaction pressure was 245–285 psig. The change in conditions with time is shown in Table V below:

TABLE V

| Time of Operation in Hours | Reaction Temp. °F. | GVHSV v/v/hr |
|---|---|---|
| 0–160[a] | 100 | 9000 |
| 161–350[b] | 130 | 9000 |
| 350–976[c] | 200 | 4500 |

[a] It was noted after 160 hours of operation that the charge stock had contained a small amount of H₂S due to a malfunction of the H₂S removal facility. This malfunction was eliminated.
[b] Arsenic breakthrough detected.
[c] After 976 hours, about 15 ppb of arsenic were noted in the outlet gases. The average amount of arsenic in the feed gas was about 400 ppb. Arsenic loading was 0.89 wt % at 976 hours using calculations based on intermittent feed analysis.

The sorbent was regenerated by first purging the hydrocarbons followed by treating with a mixture of air and steam for 2 hours at 200°F., followed by treatment with straight air for an additional 28 hours at 200°F.

The gaseous volume hourly space velocity during regeneration was 9,000 and the pressure was 1 atmosphere.

An FCC absorber gas similar to that shown for Diluent Gas No. 3 above was again passed through the sorbent bed and again the processing conditions increased in severity as the run proceeded as shown in Table VI below:

TABLE VI

| Time of Operation (Hours) | Reaction Temp. °F. | GVHSV v/v/hr |
|---|---|---|
| 0–300[a] | 100 | 4500 |
| 300–2,140[b] | 160 | 3000 |
| 2,140[c]–3,150[d] | 160 | 3000 |

[a]Average content of arsenic in feedgas about 300 ppb and the product gas contained about 35 ppb at 300 hours.
[b]No breakthrough of arsenic noted but feedgas was changed.
[c]Feedgas changed to an ethylene concentrate.
[d]No breakthrough of arsenic — test terminated. An additional arsenic loading of 0.97 wt % at 3,150 hours was calculated based on intermittent feed analysis.

As noted in Table VI, the feedgas at 2,140 hours was changed to an ethylene concentrate which had the approximate composition as shown in Table VII below:

TABLE VII

| Component | Vol. % |
|---|---|
| Nitrogen | 2.3 |
| Hydrogen | 0.9 |
| Methane | 6.7 |
| Ethylene | 4.6 |
| Ethane | 6.6 |
| Propylene | 28.9 |
| Propane | 10.4 |
| 1,3-Butadiene | 0.3 |
| Butenes | 8.9 |
| Isobutane | 8.3 |
| N-Butane | 0.4 |
| Pentenes | 9.4 |
| Isopentane | 9.8 |
| N-Pentane | 0.3 |
| Benzene | 0.2 |
| Cyclohexane | 0.9 |
| N-Hexane | 1.1 |
| Arsine as arsenic ppb (weight) | 620 |
| Arsine as arsenic ppm (weight) | 0.62 |
| Arsine as arsenic ppm (volume) | 0.20 |

The above data in Tables V and VI show the sorbent was regenerated as a lower temperature was required for arsine removal after regeneration.

EXAMPLE 19

An FCC absorber gas (having an analysis approximating that for Diluent Gas No. 3 above) was treated by passage through a bed of a supported copper oxide sorbent similar to that used in Example 18 above at about 100°F., a pressure of 245–285 psig and a gaseous volume hourly space velocity of 9,000 for 886 hours. The charge gas had an average of about 400 ppb of arsenic, and the product gas after 886 hours contained about 45 ppb of arsenic. Arsenic loading was 1.4 weight percent at 886 hours using calculations based on intermittent feed analysis.

The sorbent was regenerated in a manner similar to the regeneration treatment described in Example 18 except nitrogen was used in place of steam as a diluent.

An FCC absorber gas (having an average of 300 ppb of arsenic) was again passed through the sorbent bed and the processing conditions with time were varied as shown in Table VIII below:

TABLE VIII

| Time of Operation (Hours) | Temp. °F. | GVHSV v/v/hr |
|---|---|---|
| 0–252[a] | 100 | 9000 |
| 252–300[b] | 150 | 9000 |
| 300–2,140[c] | 150 | 3000 |
| 2,140–3,154[d] | 150 | 3000 |

[a]About 115 ppb of arsenic in the outlet gas.
[b]About 175 ppb of arsenic in the outlet gas.
[c]No arsenic breakthrough, but at 2,140 hours the feedgas was changed to the ethylene concentrate as shown in Table VII above.
[d]No arsenic breakthrough — test terminated. An additional arsenic loading of 1.07 weight percent at 3,145 hours was calculated based on intermittent feed analysis.

A copper oxide sorbent on alumina containing 13 percent copper and seven weight percent arsenic was heated to 400°F. in nitrogen and then treated with air for 16 hours while maintaining the 400°F. temperature. The arsenic was deposited on the sorbent during processing of an FCC absorber gas (Diluent Gas No. 3) for the selective removal of arsenic. The sample weight during treatment was continually monitored using a flow microbalance and no change in the weight of the sample was detected over the period of the treatment. The weight balance technique is easily sensitive to a loss of 0.5 percent or less of the arsenic present in the sample. When the above procedure was repeated except using a temperature of 700°F., the same results were obtained, namely, no weight loss of the sample. No evidence of deposition in the cooled effluent gases was noted.

Resort may be had to such variations and modifications as fall within the spirit of the invention and the scope of the appended claims.

We claim:

1. A process for regenerating a metal oxide sorbent used in the removal of arsenic from a gaseous hydrocarbon stream comprising:
   contacting said sorbent with a gas comprising free molecular oxygen at a temperature of at least 150°F. but less than that temperature where substantial amounts of arsenic are vaporized and removed from said sorbent.

2. A process in accordance with claim 1 wherein the regeneration occurs at a temperature in the range of 150° to 700°F.

3. A process in accordance with claim 2 wherein said metal oxide sorbent is dispersed upon a supporting material.

4. A process in accordance with claim 3 wherein the metal in said metal oxide sorbent is copper and the supporting material is a high surface area refractory metal oxide.

5. A process according to claim 4 wherein the support is an alumina and the sorbent is maintained in contact with said gas comprising free molecular oxygen for a time from about 2 to about 40 hours.

6. A process according to claim 3 wherein the metal on said metal oxide is lead and the supporting material is a high surface area refractory metal oxide.

7. A process according to claim 6 wherein the support is alumina and the sorbent is maintained in contact with said gas containing free molecular oxygen for a time from about 2 to about 40 hours.

8. A process which comprises:

contacting a gaseous hydrocarbon feedstream containing at least 20 ppb of arsenic with a metal oxide sorbent dispersed upon a supporting material, said sorbent comprising copper oxide or lead oxide under conditions whereby the arsenic is selectively removed by deposition on said sorbent and recovering a product hydrocarbon gas stream having less than 20 ppb of arsenic;

continuing said contacting until said recovered product has greater than 20 ppb of arsenic;

discontinuing the flow of said gaseous hydrocarbon feedstreams; and thereafter regenerating said metal oxide sorbent containing said deposited arsenic by contacting said sorbent with a gas comprising free molecular oxygen at a temperature of at least 150°F. but less than that temperature where substantial amounts of arsenic are vaporized and removed from said sorbent for a time of from 2 to 40 hours.

9. A process according to claim 8 wherein the feedstock is substantially free of acetylenes; the metal oxide sorbent is copper oxide having an oxygen uptake value of at least 40; the supporting material is alumina and the regeneration is conducted at a temperature from 150°F. to about 700°F.

10. A process according to claim 8 wherein the feedstock is a light hydrocarbon gas from a fluid catalytic cracking unit; the metal oxide sorbent is lead oxide; the supporting material is alumina; and the regeneration is conducted at a temperature from 150°F. to about 700°F.

* * * * *